United States Patent [19]

Urbanic

[11] 4,300,780
[45] Nov. 17, 1981

[54] CENTERING AND SELF-ADJUSTING CHUCK

[75] Inventor: Robert F. Urbanic, Mentor, Ohio

[73] Assignee: PMC Industries, Inc., Wickliffe, Ohio

[21] Appl. No.: 84,185

[22] Filed: Oct. 12, 1979

[51] Int. Cl.³ .............. B23B 31/16; B23B 31/30; B23B 31/34
[52] U.S. Cl. .................. 279/1 L; 279/4; 279/5; 279/121
[58] Field of Search .............. 279/1 L, 1 DC, 4, 5, 279/121

[56] References Cited

U.S. PATENT DOCUMENTS

| | | | |
|---|---|---|---|
| 2,323,091 | 6/1943 | Johnston et al. | 279/4 |
| 3,083,024 | 3/1963 | Herbkersman | 279/5 |
| 3,083,025 | 3/1963 | Herbkersman | 279/122 |
| 3,142,491 | 7/1964 | Ohashi | 279/4 |
| 3,456,956 | 7/1969 | Herbkersman | 279/4 |
| 3,751,053 | 8/1973 | Swanson | 279/1 L X |
| 3,975,030 | 8/1976 | Akeel et al. | 279/4 |

FOREIGN PATENT DOCUMENTS 1805433  5/1970  Fed. Rep. of Germany .

*Primary Examiner*—Z. R. Bilinsky
*Attorney, Agent, or Firm*—Maky, Renner, Otto & Boisselle

[57] ABSTRACT

A centering and self-adjusting chuck for clamping stock includes at least three circumferentially spaced dependent jaws that initially are displaced by being simultaneously radially inwardly driven equal distances under low pressure to center the stock positioned therebetween and further includes at least three other circumferentially spaced independent jaws that are then independently displaced by being radially inwardly driven under low pressure any distance required to have each such independent jaw engage the centered stock, the dependent and independent jaws finally being displaced by being simultaneously radially inwardly driven under higher pressure tightly and uniformly to clamp the stock therebetween for subsequent machining.

7 Claims, 5 Drawing Figures

CENTERING AND SELF-ADJUSTING CHUCK

SUMMARY OF THE INVENTION

As indicated, the present invention relates to a chuck that is initially operative lightly to center stock, is then operative lightly to engage the centered stock at circumferentially spaced locations in spite of any out of roundness in the stock and is finally operative positively to clamp the thus centered and engaged stock for subsequent machining. The term "stock" is generically used herein to encompass any structural form of any cross sectional configuration capable of being clamped by the chuck of the present invention.

In the late 1950's and early 1960's, pipe stock ready for machining was centered in a chuck by conventional swinging centering cones positioned between the rotary tool head and the chuck. Such chucks typically included reciprocally movable jaws driven equidistantly radially inwardly under clamping pressure until the end of the cone centered stock was unyieldingly clamped therebetween for machining. Such chucks with equidistant radial jaw travel are shown, for example, in U.S. Pat. Nos. 2,982,557 and 3,083,025, owned by the assignee of the present invention. These chucks were normally quite satisfactory, but unfortunately some stock, such as pipe and pipe couplings, may occasionally be out of round or may be slightly longitudinally bowed or curved. Although the centering cones generally satisfactorily compensated for any lengthwise curvature by centering the stock end relative to the chuck for clamping and machining exclusively at that end, the chucks with equidistant jaw travel could not always adequately compensate for any out of roundness in the stock. Consequently, the out of round stock was clamped with varying pressure magnitudes at circumferentially spaced positions potentially resulting in structural deformation of the stock or in disturbing the set of the stock. In either event, the subsequently machined stock was difficult or impossible to use because of the structural deformation and/or unacceptable finishing resulting therefrom.

In an attempt to rectify these problems, a chuck having floating jaws was developed in which all the jaws were displaced by being independently radially inwardly moved under low pressure for self-adjusting contact with the cone centered stock and were then equidistantly radially inwardly urged under higher pressures uniformly to clamp the stock, with the clamping pressure applied by each jaw being equal to that of each other jaw. This self-adjusting or floating chuck permitted out of round stock reliably to be finished without structural problems, but still required space consuming, relatively expensive centering devices to be used in combination with the chuck. Maintenance and operational problems occasionally resulted from procedurally interrelating the two independently functioning centering and clamping devices. In addition, the floating chuck was primarily limited to clamping the centered end of the stock.

To eliminate these disadvantages, the principal object of the present invention is to provide a chuck sequentially capable (1) of lightly centering stock, (2) of peripherally lightly engaging the centered stock and (3) of positively and uniformly clamping the thus centered and engaged stock. To this end, the chuck of the present invention includes alternately circumferentially positioned dependent and independent jaws selectively radially cycled by a pressure actuation system having a three stage operational sequence. This pressure actuation system first exerts a low pressure on the dependent jaws for equidistant radial movements thereof to center the stock, then exerts a low pressure on the independent jaws for independent self-adjusting radial movements thereof to engage the centered stock while compensating for any stock out of roundness, and finally exerts a high pressure simultaneously on the dependent and independent jaws for equidistant radial clamping movements thereof on the thus centered and engaged stock.

By using such structure and procedure, the extraneous, independently functioning centering mechanism may be eliminated to reduce equipment costs, floor area requirements and operational problems caused by attempting to interrelate functions performed on different machines. In addition, the stock may be clamped at any point along its length since the centering and clamping functions are performed in the same vertical plane by radial jaw movements. Therefore, the chuck of the present invention is not limited to clamping the ends of potentially longitudinally curved stock but instead may clamp the stock at any longitudinal location therealong to provide greater machining flexibility and capability.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWING

In the annexed drawings:

FIGS. 4A and 4B are schematic fragmentary front elevations respectively sequentially showing the positions of the dependent and independent chuck jaws during initial centering (4A) and subsequent self-adjusted low pressure engagement (4B).

DESCRIPTION OF THE PREFERRED EMBODIMENT

Figure 1:
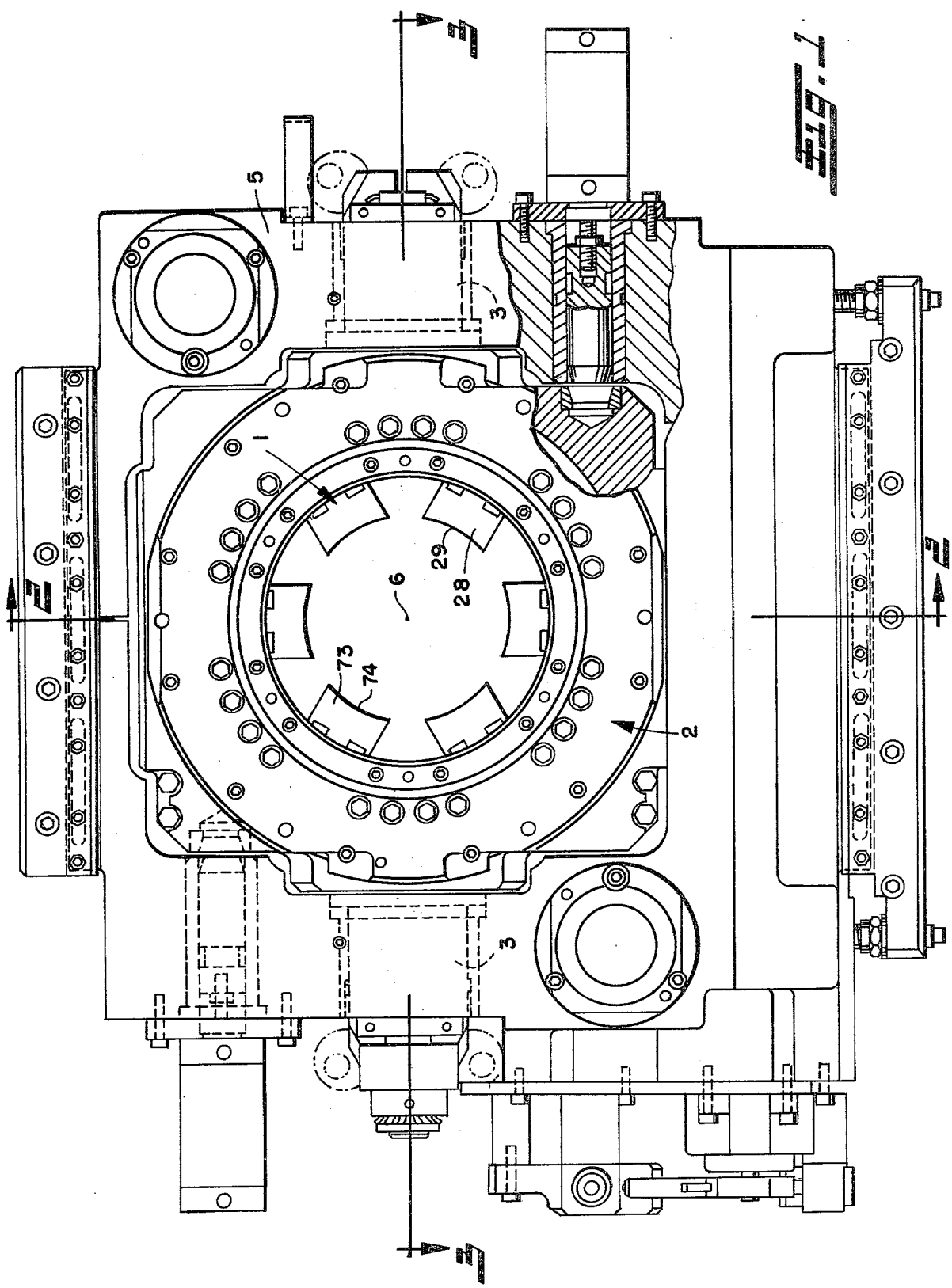
FIG. 1 is a front elevation of the chuck of the present invention and a portion of its supporting structure.

Referring now in more detail to the drawings and initially to FIG. 1, the chuck, indicated generally at 1, is mounted in an annular body, indicated generally at 2, supported on horizontal trunnions 3 pivotally secured to frame 5 selectively to permit the body 2 to be rotated about a horizontal axis. This selective body rotation permits the clamped stock extending generally along the longitudinal axis 6 of the body to be rolled over for successive machining of both ends without release of the stock as described and claimed in U.S. Pat. No. 3,083,024, owned by the assignee of the present invention. Although a roll over body is illustrated, the chuck of the present invention may be fixedly or movably mounted in any type of body or frame to clamp any type of stock for machining. Although the term stock is generically used herein as defined above, the chuck of the present invention is particularly adapted to clamping stock consisting of pipe and pipe couplings, and the invention will be described for purposes of convenience in use with, but obviously not limited to, a pipe coupling as shown at 7 in FIGS. 4A and 4B.

Figure 2:
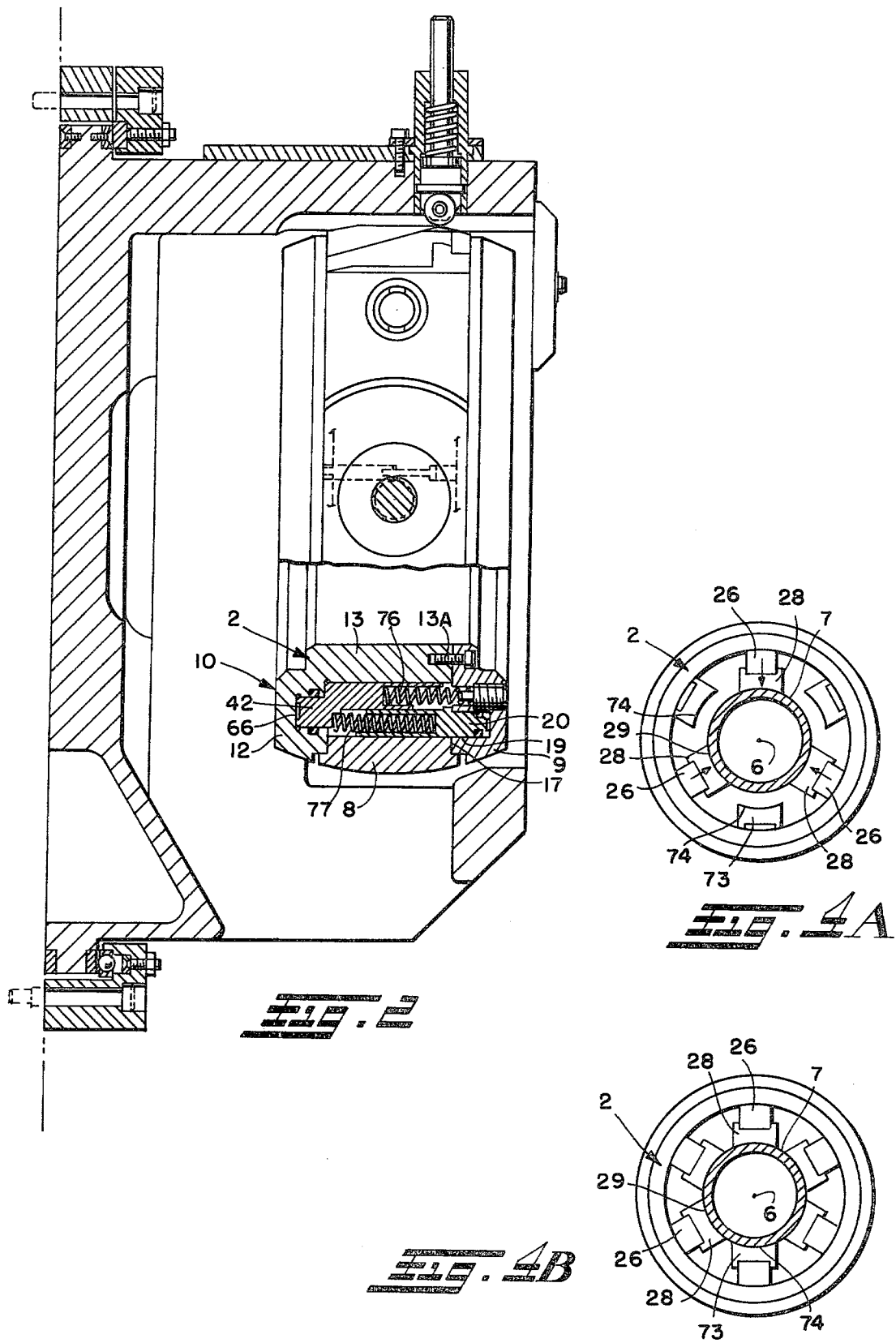
FIG. 2 is a vertical cross section taken along the plane 2—2 of FIG. 1 showing, among other things, one of a series of springs extending between and oppositely biasing the independent and dependent pistons normally to urge the chuck to an open position.

The roll over body 2 is a composite structure including an annular mount 8 fixedly but removably secured by threaded connections to the trunnions 3. The annular mount 8 is sandwiched between and fastened to the radially outer ends of an annular shell 9 and a complementary annular stabilizer cap indicated generally at 10. The annular stabilizer cap 10 has a cross section generally L-shape in configuration as best shown in FIG. 2, with the radially outer end of the shorter leg 12 being fastened at 12A to mount 8 and with the free end of the axially oriented longer leg 13 being in abutment with and fastened at 13A to the radially inner end of shell 9. The mount 8, shell 9 and stabilizer cap 10 thus define a composite body 2 having a hollow annular core 15 receiving the pressure operated piston and cylinder mechanisms selectively driving the dependent and independent jaws radially inwardly of the body 2.

To this end, the inner face 17 of shell 9 includes an annular channel forming a cylinder 19 slidably to receive an annular dependent collet piston 20 projecting inwardly into the annular body core 15 except for three circumferentially spaced slots 21 providing clearance for the independent jaw actuators. Three wedge blocks 22 are individually connected at 120° circumferential spacing increments to the radially inner sidewall 23 of collet piston 20. The inclined cam surfaces 24 of wedge blocks 22 have a sliding T slot connection with the correspondingly inclined follower surfaces 25 on dependent jaw wedges 26. The dependent jaw wedges have a very limited clearance along inner face 17 of shell 9 to permit slight axial play during radial movement of the jaw wedges to avoid binding. A dependent chuck jaw 28 with a contoured stock gripping surface 29 is removably connected to the radially inner end of each jaw wedge 26. The three pairs of wedge blocks 22 and dependent jaw wedges 26 are individually received in and slide along circumferentially spaced radial guidance slots 30 in axial leg 13 of body stabilizer cap 10. The dependent wedge block and jaw wedge pairs are normally urged radially outwardly by spring means extending axially between and being connected to the dependent piston 20 and the independent piston, thereby normally to urge the chuck jaws to an open position as described in more detail hereinafter unless pressure is applied to the dependent jaw piston cylinder assembly just described.

Figure 3:
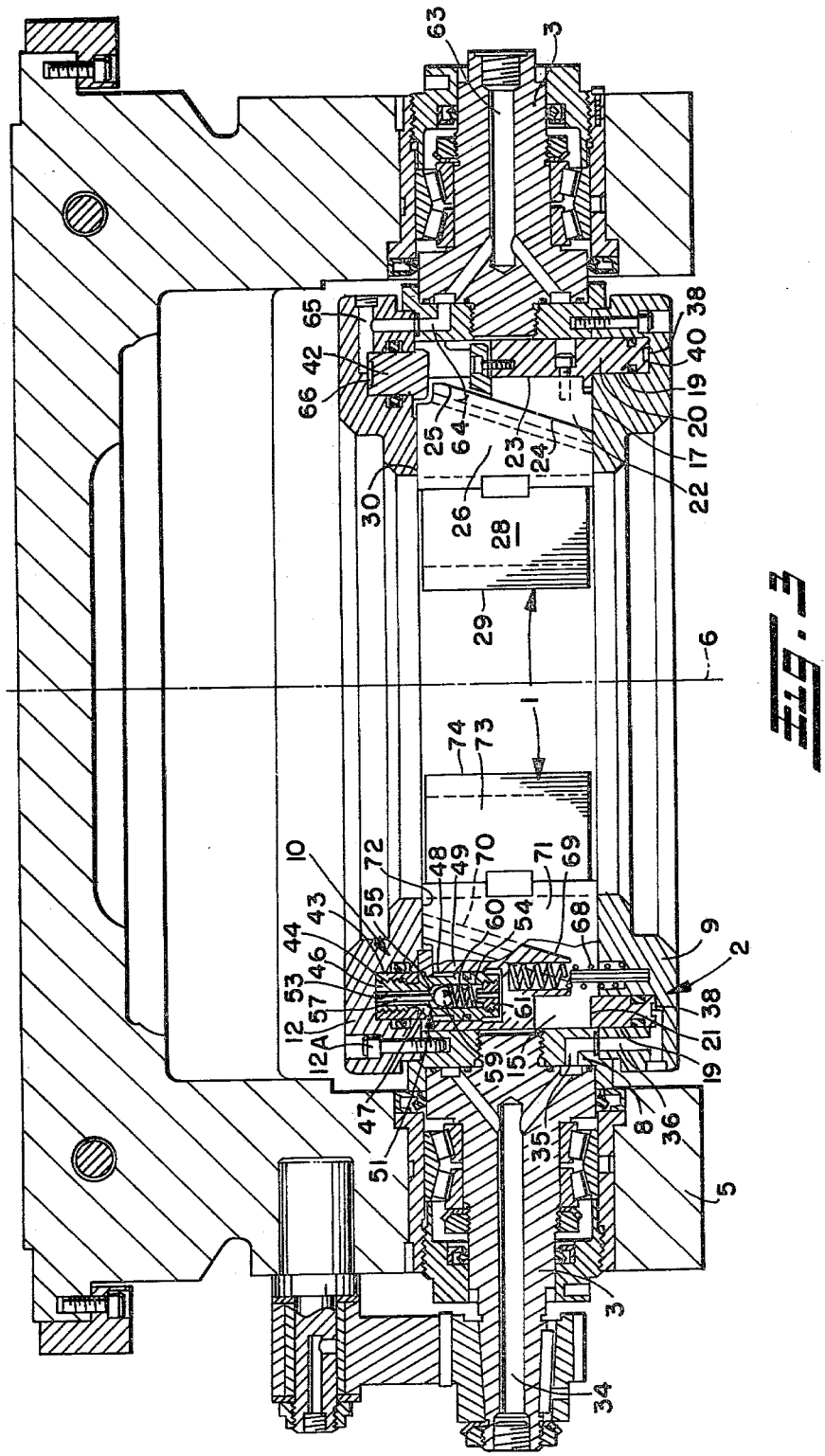
FIG. 3 is a horizontal cross section taken along the plane 3—3 in FIG. 1 showing the details of the independent and dependent jaws and the pressure actuation system for the same in their open or non-clamping position.

The pressure system for the dependent jaws includes an oil supply conduit 34 extending through the left trunnion 3 as viewed in FIG. 3 fluidically to communicate with sealed passage 35 in mount 8 and sealed passage 36 in annular shell 9. The outlet of passage 36 directly communicates with an annular pressure groove 38 in the blind end 40 of dependent collet piston 20. As described in more detail below, application of oil pressure to the blind end groove 38 of collet piston 20 drives the same axially inwardly along the cylinder 19 and the inner face of annular mount 8, with the simultaneous axial movement of the wedge blocks 22 being converted to radially inwardly directed movement of the jaw wedges 26 by the sliding movement of cam surfaces 24 along follower surfaces 25. The sequence and magnitude of pressure application to the dependent jaws is interrelated to the pressure operation of the independent jaws, as described in more detail hereinafter.

The pressure actuation system for the independent jaws includes an annular independent piston 42 slidably received for reciprocal axial movement in an annular cylinder 43 formed by a channel shape groove in the inner face of radially extending leg 12 of the stabilizer cap 10. At 120° circumferential increments, the annular independent piston 42 has three internally threaded bores 44 respectively threadedly to receive the externally threaded shanks 46 on three individual chuck jaw pistons 47, whereby the individual chuck jaw pistons 47 and annular independent piston 42 move axially together. The inwardly projecting ends of the chuck jaw pistons 47 are each received for axial reciprocal movement in the respective cylinders 48 provided in each of the three independent wedge blocks 49.

For independent actuation of the wedge blocks 49, the individual chuck jaw pistons 47 have identical valving systems. Each such valving system includes a stepped bore extending axially through the individual chuck jaw piston 47. The stepped bore, indicated generally at 51, is formed by a small diameter bore 53 and a larger diameter bore 54 being interconnected by a frusto conical surface forming a valve seat 55 for a check valve. Such check valve includes a release pin 57 loosely received in, but slightly longer than the smaller diameter bore 53. Initially, the outer end of the release pin 57 is in connection with the inner face of leg 12 of stabilizer cap 10, and the inner end of release pin 57 is normally in abutment with a valve closure ball 59. A spring 60 extending between a shoulder 61 in larger diameter bore 54 and the valve closure ball 59 normally urges the closure ball against the inner end of the release pin 57, with the ball 59 in such position being slightly spaced from the valve seat 55 to permit some flow of pressurized oil therepast.

For this purpose, the pressure system for the independent jaws includes an oil supply conduit 63 extending through right trunnion 3 as viewed in FIG. 3 fluidically to communicate with sealed passage 64 in mount 8 and then with sealed passage 65 in annular leg 12 of stabilizer cap 10. The outlet of passage 65 directly communicates with an annular pressure groove 66 in the blind end of independent piston 42. The pressure groove 66 intersects and fluidically communicates with the smaller diameter bores 53 in each of the three individual chuck jaw pistons 47 carried by the annular independent piston 42.

When oil is pumped under relatively light pressure through annular pressure groove 66, the pressurized oil will pass through each of the three smaller diameter bores 53, past open valve closure balls 59, and then through larger diameter bores 54. The pressurized oil then collects behind and bears against the ends of each of the three cylinders 48 of wedge blocks 49. This oil pressure drives the wedge blocks 49 axially forwardly by overcoming the spring pressure normally urging such wedge blocks to axially retracted or open position. More specifically, three springs 68 (FIG. 3) are circumferentially spaced in the hollow core 15 of body 2 at 120° increments and are individually interposed between the inner face of shell 9 and the wedge blocks 49 respectively to bias the latter to axially retracted or open positions. When the relatively low oil pressure acting on the ends of cylinders 48 overcomes the oppositely directed pressure exerted on wedge blocks 49 by the springs 68, the wedge blocks 49 are independently driven axially away from the leg 12 of stabilizer cap 10.

This independent axial advancement of independent wedge blocks 49 moves the inclined camming surfaces 69 thereof along the mating inclined follower surfaces 70 on the independent jaw wedges 71, which are slidably received in radial guidance slots 72 in leg 13 of stabilizer cap 10. The relative axial movement of cam surfaces 69 along follower surfaces 70 with sliding T slot interconnections therebetween drives the three independent jaw wedges 71 radially inwardly relative to body 2. The independent jaw wedges 71 have very limited clearance along the upper wall of slot 72 as viewed in FIG. 3 to permit slight axial play of the wedges during radial movement to avoid binding. The radially inner ends of the independent jaw wedges 71 removably carry independent chuck jaws 73 having contoured stock gripping surfaces 74. The three independent chuck jaws 73 are circumferentially spaced 120° apart and are alternately positioned between the circumferentially spaced dependent jaws 28, as best shown in FIG. 1. The three independent chuck jaws 73 are normally urged radially outwardly to an open position by return springs 68 extending between and connected to shell 9 and wedge blocks 49. When driven, the respective independent chuck jaws 73 advance radially inwardly independently of one another.

This independent radial advancement of the independent chuck jaws is provided by the passage of low pressure oil into the three parallel stepped bores leading to the three cylinders 48 in the three individual wedge blocks 49. Therefore, each of the independent jaws 73 is radially inwardly advanced until the contoured surface 74 thereof engages the centered coupling 7 with low pressure so that the coupling will not be radially distorted or lose its set. Due to the parallel hydraulic connection, as each independent jaw 73 engages the coupling under low pressure, its wedge block 49 independently stops advancing in a wedging direction. However, as long as any independent jaw is out of engagement with the coupling, the venting of pressurized oil from pressure groove 66 to the cylinder 48 for the unengaged jaw will result in continued radial advancement of the respective independent jaw until engagement is made with the coupling, this independent venting keeping the pressure in groove 66 below line pressure.

When all the independent jaws 73 have independently advanced into circumferentially spaced engagement with coupling 7, the pressure in wedge cylinders 48 equalizes and the flow of pressurized oil into the wedge cylinders 48 ceases. When this flow ceases, the unit pressure in groove 66 almost instantaneously builds up to line pressure. Thereupon, since the area of the annular independent piston is much greater than the combined areas of the inner ends of the individual chuck jaw pistons 47, the total pressure force acting on the independent piston 42 and urging it toward the wedge blocks 49 is greater than the oppositely acting pressure force on the independent piston consisting of oil pressure on the individual chuck jaw pistons 47 and spring pressure on the independent piston 42. With respect to the spring pressure, the independent piston is normally biased by two sets of springs toward the blind end of cylinder 43 to a fully retracted position therein corresponding to the open condition of the independent jaws.

The first set of springs includes a plurality of circumferentially spaced compression springs 76 positioned in the hollow core 15 of body 2 between the dependent and independent jaw actuation mechanisms. Such compression springs 76 extend between the shell 9 and the inner end of annular independent piston 42 normally to urge the same toward the end of cylinder 43, as best shown in FIG. 2. The second set of springs also consists of a plurality of compression springs 77 positioned in the hollow core 15 of body 2 between the jaw actuation mechanisms in alternated relationship with spring 76. As best shown in FIG. 2, the springs 77 extend between the dependent piston 20 and the independent piston 42, thereby to have the dual functions of urging the independent piston 42 in the opposite direction toward the end of cylinder 43. By biasing the independent piston and dependent pistons apart toward the ends of their respective cylinders, the various springs are free to return the dependent and independent jaws to a radially expanded open position unless pressure is applied for clamping.

In this regard, when the line pressure force on the independent piston overcomes in opposing fluid and spring forces, the independent piston 42 and the three individual chuck jaw pistons 47 carried thereby begin to axially advance in a wedging direction toward the wedge blocks 49. During this initial movement, a small part of the fluid in the cylinders 48 of wedge blocks 49 is forced back through the stepped bores 51 in the individual chuck jaw pistons due to the axial advancement of the latter. Thereupon, the check valves close by the stationary valve closure ball 59 tightly engaging the axially advanced frusto conical valve seat 55 to form a fluid-tight seal. This check valve closure hydraulically locks the wedge blocks 49 to the individual chuck jaw pistons 47 and precludes the wedge blocks from retracting in the opposite direction.

With the check valves thus closed, the pressure fluid becomes effective on the much larger area of the independent annular piston 42 and drives it forwardly against the resistance of compression springs 76 and 77. Due to the hydraulic interlock between the wedge blocks 49 and the individual chuck jaw pistons 47 caused by the check valve closure trapping hydraulic fluid in the cylinders 48 therebetween, the individual chuck jaw pistons 47 and cylinders 48 act as rigid compression members and move all three independent wedge blocks 49 concurrently with and in fixed relation to annular independent piston 42. Such concurrent movement results in the three wedge members 49 axially equidistantly advancing in a wedging direction from the positions assumed by the wedge blocks after the initial self-adjusting contact had been established. Such equidistant axial advancement of wedge blocks 49 under higher line pressure results in the inclined camming surface 69 thereof moving along the mating inclined follower surface 70 on the three independent jaw wedges 71 thereby to cam the latter radially inwardly to advance the independent jaw members 71 carried thereby toward the coupling 7. Such equidistant radial advancement of the independent jaw members 71 under high pressure unyieldingly and uniformly clamps the pipe coupling 7 therebetween for subsequent machining. This higher pressure clamping by the independent jaw members is concurrently accompanied by higher pressure clamping of substantially equal magnitude by the dependent jaws until the clamping of the coupling 7 is completed.

To open the chuck, the pressure on the independent piston 42 is released by venting. Springs 76 and 77 are then operative to return the independent piston 42 and the three independent chuck jaw pistons 47 carried thereby to the axially retracted position seated at the blind end of the cylinder 43 in the stabilizer cap 10. This return movement opens the chuck valves by the release pin 57 holding the valve closure ball 59 off the valve seat 55. The trapped fluid between the independent chuck jaw pistons 47 and cylinders 48 is then free to escape through the respective open stepped bores 51 in each such independent chuck piston 47. The springs 68 are then operative to return the wedge blocks 49 and the independent jaw wedges 71, slidably connected thereto by the T slot, to their retracted or open positions to precondition the chuck for its next operative cycle, with the return of the wedge blocks 49 forcing the trapped fluid through the open stepped bores to vent. Although the operative cycle of the centering and self-adjusting chuck should be apparent from the preceding description, a brief summary of such operational cycle is set forth hereinafter.

Initially, oil is pumped through passages 34, 35 and 36 at a relatively low pressure in the range of 125 psi into the pressure groove 38 in the blind end of the dependent collet piston 20. This pressurized oil forces the dependent collet piston 20 axially to advance in a wedging direction along cylinder 19 and the inner face of annular mount 8, resulting in concurrent axial advancement of the three wedge blocks 22 fixedly carried thereby. The equidistant axial advancement of the wedge blocks 22 results in the inclined camming surfaces 24 thereof moving along the mating follower surface 25 of dependent wedge blocks 26, thereby simultaneously to drive the latter radially inwardly along guidance slots 30 in the axial leg 13 of stabilizer cap 10. This simultaneous radial advancement of the three dependent jaw wedges 26 simultaneously radially inwardly advances the three dependent jaw members 28 carried thereby until a contoured engagement surface 29 on all three of such dependent jaw members engages the pipe coupling 7 positioned therebetween as schematically illustrated in FIG. 4A. Although the engagement of the dependent jaw members and the coupling 7 is illustrated as being uniform across the entire contoured stock gripping surfaces 29, this uniformity might not exist for an out of round coupling which would, however, be engaged in some manner by all three dependent jaw members for the centering function. Such engagement by all three of the gripping surfaces 29 on dependent jaw members 28 arrests the forward advancement of the engaged jaw member and overcomes the relatively low pressure force acting on the dependent collet piston thereby substantially simultaneously to stop the radial advancement of all the dependent jaw members with the coupling 7 at such point being centered therebetween.

At such stage in the operational sequence, oil is then pumped through passages 63, 64 and 65 under relatively low pressure in the range of 125 psi independently to advance the independent jaw members into self-adjusting or independent contact with the thus centered coupling 7. This self-adjusted contact is permitted by the parallel hydraulic connection of the initially open step bores 51 in the three independent chuck jaw pistons 47 carried by the independent piston 42. The open stepped bores in parallel relationship permit the low pressure fluid independently to drive each of the three independent wedge blocks 49 in an advancing or wedging direction until each of the three independent jaw members has come into independent self-adjusted engagement with the centered coupling 7 as discussed in more detail above and as shown schematically in FIG. 4B.

At this point, the three stepped parallel bores are closed by the check valves therein being seated on the frusto conical surfaces 55 thereof. This results in a hydraulic interlock being formed between the independent piston and the three independent jaw wedges to permit a higher line pressure in the range of 250 psi to be exerted thereagainst simultaneously equidistantly to advance the independent wedge block in a wedging or camming direction. This higher pressure equidistant advancement of the independent jaw members is simultaneously accompanied by a higher pressure advancement of equal magnitude on the dependent jaw members equidistantly radially inwardly to drive the same. The dependent and independent jaw members 28 and 73 are thus being simultaneously equidistantly driven in a radially inward direction uniformly unyieldingly to clamp the coupling therebetween. This uniform advancement of the independent and dependent jaw members results in the pressure applied to the clamped coupling being the same at each such dependent and independent jaw member. By providing the respective clearances between dependent jaw wedges 26 and face 17 and between independent jaw wedges 71 and slot 72 at opposite sides of the annular body 2, any potential axial play during clamping is effectively removed.

When the machining of the clamped coupling 7 has been completed, the high pressure on both the dependent and independent jaw mechanisms is released by venting to permit the dependent and independent jaw mechanisms to return to their retracted or open positions under the influence of the springs described. Such dependent and independent jaws are maintained in such open position by such springs until the next clamping cycle is initiated.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A centering and self adjusting chuck selectively to clamp stock comprising:
    an annular body having a central longitudinal axis therethrough;
    first dependent jaw means including
        first piston cylinder means axially oriented in said body,
        first wedge block means in said body axially driven by said first piston cylinder means, and
        dependent jaw members circumferentially spaced around and slidably radially mounted in said body, said dependent jaw members being cammed by said first wedge block means to be simultaneously radially inwardly driven equal distances by axial advancement of said first piston cylinder and wedge block means;
    second independent jaw means including second piston cylinder means axially oriented in said body in a direction opposite to said first piston cylinder means, second wedge block means in said body axially driven by said second piston cylinder means, and independent jaw members circumferentially spaced around and slidably radially mounted in said body to operate in substantially the same radial plane as said dependent jaws, said independent jaw members being cammed by said second wedge block means to be radially advanced equal or unequal distances by axial advancement of said second piston cylinder and wedge block means;

pressure means including a first fluid passage system communicating with said first piston cylinder means through one end and side of said body, a second fluid passage system communicating with said second piston cylinder means through the other end and side of said body, said second fluid passage system connecting the second piston cylinder means in parallel flow relationship to permit said independent jaws to be radially advanced equal or unequal distances;

jaw control means operative initially to drive the dependent jaw members equally radially inwardly by supplying low pressure fluid to said first fluid passage system to actuate said first piston cylinder means, said dependent jaw members being driven until all of the same contact the stock positioned therebetween to arrest their radial movement when the low pressure is overcome by said contacts, with the stock then being generally centered therebetween, subsequently to drive the independent jaw members radially inwardly independent of one another by supplying low pressure fluid to said second fluid passage system to actuate said second piston cylinder means fluidically connected in parallel with respect to one another, said independent jaw members being radially inwardly driven until each such jaw member independently contacts the centered stock irrespective of travel magnitude, thereby to overcome the low pressure by such contacts and arrest further travel of that independent jaw in self adjusted yielding engagement with the stock and finally operative simultaneously radially inwardly to drive the dependent and independent jaw members by supplying higher pressure fluid to both said first and second fluid passage systems to provide a positive clamp on the stock positioned therebetween, with substantially equal pressure being exerted by each such jaw member in contact with the stock to permit subsequent finishing operations; and means to return the dependent and independent jaw means to radially retracted positions.

2. A centering and self-adjusting chuck as set forth in claim 1 said means to return includes spring means normally to bias the first dependent jaw means and second independent jaw means to retracted positions wherein the dependent and independent jaw members are radially retracted relative to the longitudinal axis to be in an open condition.

3. A centering and self-adjusting chuck as set forth in claim 2 wherein said spring means normally to bias includes a plurality of circumferentially spaced springs extending between said first and second piston cylinder means normally to bias the same in opposite directions to their respective retracted positions within said body.

4. A centering and self-adjusting chuck as set forth in claim 1 wherein said body has a hollow core and said first and second piston cylinder means are positioned at opposite ends of said hollow core at alternated circumferentially spaced locations around said core.

5. A centering and self-adjusting chuck as set forth in claim 4 wherein said first and second wedge block means when driven in opposite axial directions respectively cam wedge follower surfaces on said dependent and independent jaw members radially to drive the same.

6. A centering and self-adjusting chuck as set forth in claim 4 wherein said first dependent jaw means includes at least three dependent jaw members and at least three first piston cylinder means respectively operatively associated therewith and said second independent jaw means includes at least three independent jaw members and at least three second piston cylinder means respectively operatively associated therewith.

7. A centering and self-adjusting chuck as set forth in claim 1 wherein the final high clamping fluid pressure is approximately two time greater than the initially applied lower fluid pressure.

* * * * *